(12) United States Patent
Garbett et al.

(10) Patent No.: US 7,323,108 B1
(45) Date of Patent: *Jan. 29, 2008

(54) COMBINED BIOLOGICAL AND BALLASTED FLOCCULATION PROCESS FOR TREATING WASTEWATER

(75) Inventors: Ross Alan Garbett, Raleigh, NC (US); Michael Leon Gutshall, Holly Springs, NC (US); Barry Wayne Hendley, Cary, NC (US); Branden Edmond Hudson, Cary, NC (US)

(73) Assignee: I. Kruger, Inc., Cary, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/736,229

(22) Filed: Apr. 17, 2007

(51) Int. Cl.
*C02F 3/00* (2006.01)

(52) U.S. Cl. .................. 210/607; 210/618; 210/626; 210/631

(58) Field of Classification Search .............. 210/607, 210/615–618, 620–626, 631
See application file for complete search history.

(56) References Cited

U.S. PATENT DOCUMENTS

| | | | | |
|---|---|---|---|---|
| 5,976,375 A | * | 11/1999 | Dorica et al. | 210/610 |
| 6,277,285 B1 | * | 8/2001 | Vion | 210/709 |
| 6,783,679 B1 | * | 8/2004 | Rozich | 210/614 |
| 7,153,431 B2 | * | 12/2006 | Daugherty | 210/622 |

FOREIGN PATENT DOCUMENTS

FR 2719235 A1 * 11/1995

* cited by examiner

*Primary Examiner*—Chester T. Barry
(74) *Attorney, Agent, or Firm*—Coats & Bennett, P.L.L.C.

(57) ABSTRACT

A wastewater treatment process is provided that entails both a biological or activated sludge process and a ballasted flocculation process. A first stream of wastewater is directed to a biological system for biologically treating the wastewater. The biological treatment process produces a first effluent and a first sludge. In cases where the biological system is an activated sludge process, the first sludge is recycled. A second stream of wastewater is directed to a ballasted flocculation system. The second stream of wastewater can be a stream independent of the first stream of wastewater or can be derived from the wastewater passing through the biological system. Sludge in the form of activated sludge or mixed liquor from the biological system is mixed with a second stream of wastewater in the ballasted flocculation system for the purpose of biologically treating the second stream of wastewater. Forming a part of the ballasted flocculation system is a settling tank that produces a second effluent and a second sludge. The second sludge is routed to a separator where granular material that forms a ballast in the process is separated and recycled. To effectively remove suspended solids from the wastewater passing through the ballasted flocculation system, the second sludge recycle rate is controlled or maintained at a flow rate of about 15% and higher of the influent flow rate to the ballasted flocculation system. Furthermore, as the mixed liquor suspended solids (MLSS) concentration increases from, for example, 1000 mg/l to about 4000 mg/l, the recycle rate of the second sludge may be varied from about 15% to about 40% of the influent flow rate to the ballasted flocculation system.

24 Claims, 2 Drawing Sheets

COMBINED BIOLOGICAL AND BALLASTED FLOCCULATION PROCESS FOR TREATING WASTEWATER

FIELD OF THE INVENTION

The present invention relates to a wastewater treatment process involving both a biological treatment process and a ballasted flocculation process.

BACKGROUND OF THE INVENTION

Biological systems are widely used throughout the world to treat wastewater. Many variations are found in biological wastewater treatment systems. Perhaps the most popular biological system being used throughout the world is referred to as an activated sludge system. Activated sludge systems typically include a number of reactors and a clarifier that together perform secondary treatment on the wastewater. Anaerobic, aerobic and anoxic processes can be carried out in these reactors. Generally, the clarifier is positioned downstream from the reactors and separates clarified effluent from sludge. In an activated sludge process, at least a portion of the sludge is recycled to one or more upstream reactors and the biomass associated with the recycled sludge is operative to treat the water by removing such contaminants as nitrogen, phosphorus, BOD, etc.

Over a period of time, many conventional biological wastewater treatment systems reach a point where the wastewater treatment system is operating at or near capacity of their design flow rates. This is a particular problem where areas served by the wastewater treatment system experience heavy or abnormal rainfall. In some cases, a rainstorm can release so much water to the wastewater treatment system that the system is severely overloaded with excess influent flows.

Municipalities and other regional wastewater entities are challenged when it comes to dealing with this problem. There are a number of options, but most options are expensive and require substantial time to implement. One approach is to build a new wastewater facility to handle the excess flows. Another option is to add on to or modify the existing wastewater treatment facility. Again, all of these options require substantial capital expenditures.

In many cases, the excess capacity that a conventional biological wastewater treatment system is required to accommodate comes from stormwater. Generally, the nutrients and contaminants that have to be removed from stormwater are not as extensive as is wastewater from other sources, such as homes and businesses. In fact, in dealing with stormwater runoff, one of the most limiting factors in a conventional biological wastewater treatment system is clarification. Recognizing that clarification is a substantial limiting factor in a conventional biological wastewater treatment system, it has been proposed to combine a ballasted flocculation system with a conventional biological or activated sludge system where the ballasted flocculation system provides additional clarification capacity. See the disclosures found in U.S. patent application Ser. No. 11/086,849 entitled "Method and System for Utilizing Activated Sludge in a Ballasted Flocculation Process to Remove BOD and Suspended Solids", and U.S. patent application Ser. No. 11/331,540 entitled "Water or Wastewater System and Method for Removing BOD and Suspended Solids Through an Activated Sludge Process and a Ballasted Flocculation Process", both of which are owned by the Assignee of the present invention, I. Kruger Inc. of Cary, N.C. USA. While ballasted flocculation systems can perform in conjunction with conventional activated sludge systems, combining the two approaches presents many challenges. After all, ballasted flocculation systems have, for the most part, been used in treating drinking water—not wastewater. In systems that combine biological treatment and ballasted flocculation treatment, treating the wastewater passing through ballasted flocculation portions of the total system presents different challenges and concerns then those typically presented when the ballasted flocculation system treats drinking water.

SUMMARY OF THE INVENTION

The present invention relates to a process for treating wastewater utilizing a biological system and a ballasted flocculation system. Wastewater influent passing through the ballasted flocculation system is biologically treated with a first sludge from the biological system. The wastewater passing through the ballasted flocculation system is directed into a settling tank where a second sludge, including a ballast, is separated from a clarified effluent. The second sludge is recycled to a separator where the ballast is separated from the sludge and recycled back to the ballasted flocculation system. In order to effectively treat the wastewater passing through the ballasted flocculation system, the recycle rate of the second sludge is controlled or maintained at about 15% or more of the influent flow to the ballasted flocculation system.

The present invention also includes a process involving a biological system and a ballasted flocculation system of the type described above wherein the ballast is added and mixed with the wastewater in the ballasted flocculation system such that the ballast, which is usually an insoluble granular material, is maintained at a concentration of at least 20 g/l.

Further, in some embodiments of the present invention, the second sludge recycle rate and the flocculant concentration to be added to the wastewater in the ballasted flocculation system are controlled relative to the concentration of mixed liquor suspended solids (MLSS). Generally, the recycle rate of the second sludge is increased as the MLSS concentration of the influent to the ballasted flocculation system increases. Likewise, as the MLSS concentration in the influent wastewater to the ballasted flocculation system increases, the process entails increasing the concentration of the flocculant in the wastewater being treated in the ballasted flocculation system.

Other objects and advantages of the present invention will become apparent and obvious from a study of the following description and the accompanying drawings which are merely illustrative of such invention.

DESCRIPTION OF EXEMPLARY EMBODIMENT OF THE INVENTION

Figure 1:
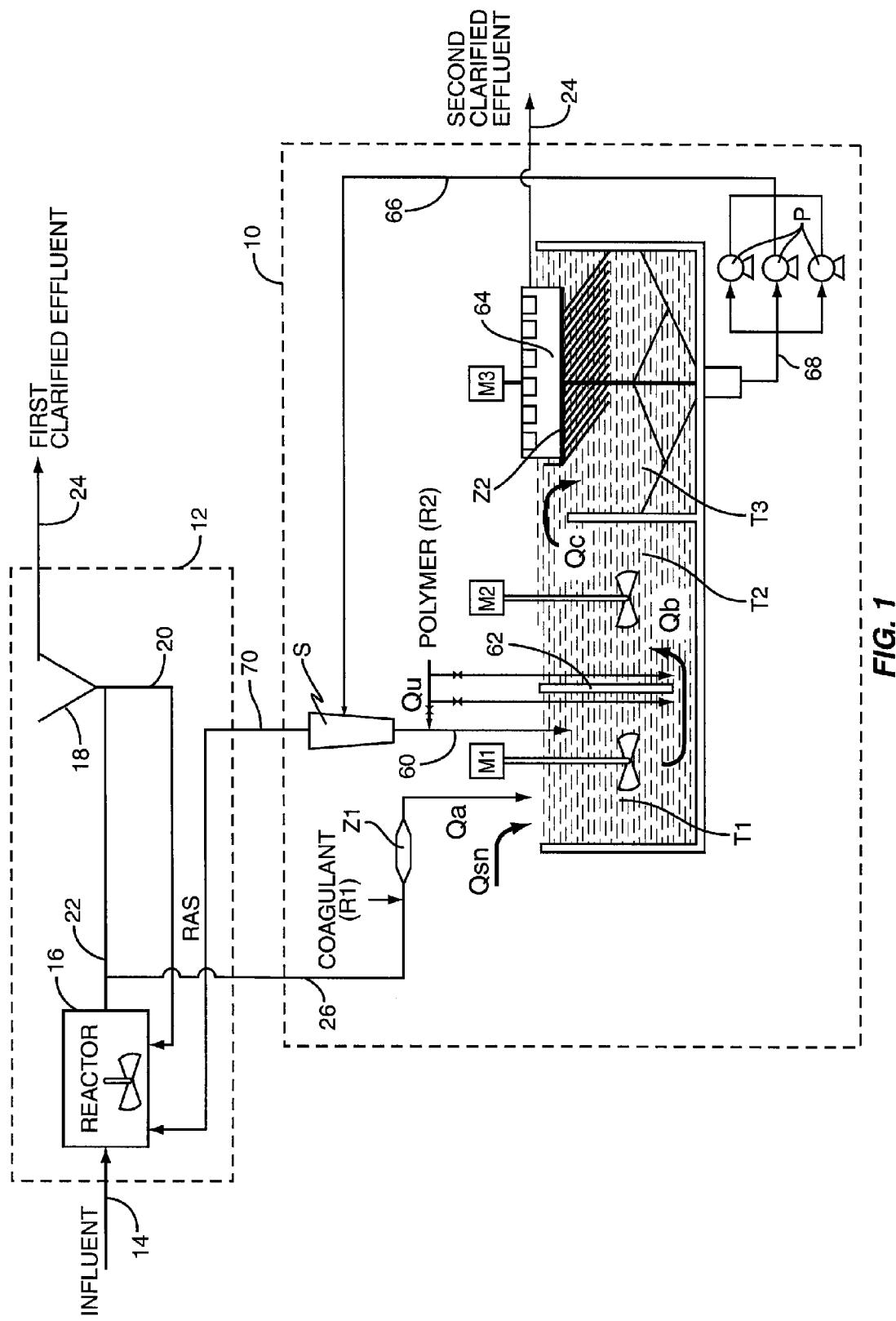
FIG. 1 is a schematic illustration showing a wastewater treatment process that includes a biological treatment system and a ballasted flocculation system.
Figure 2:
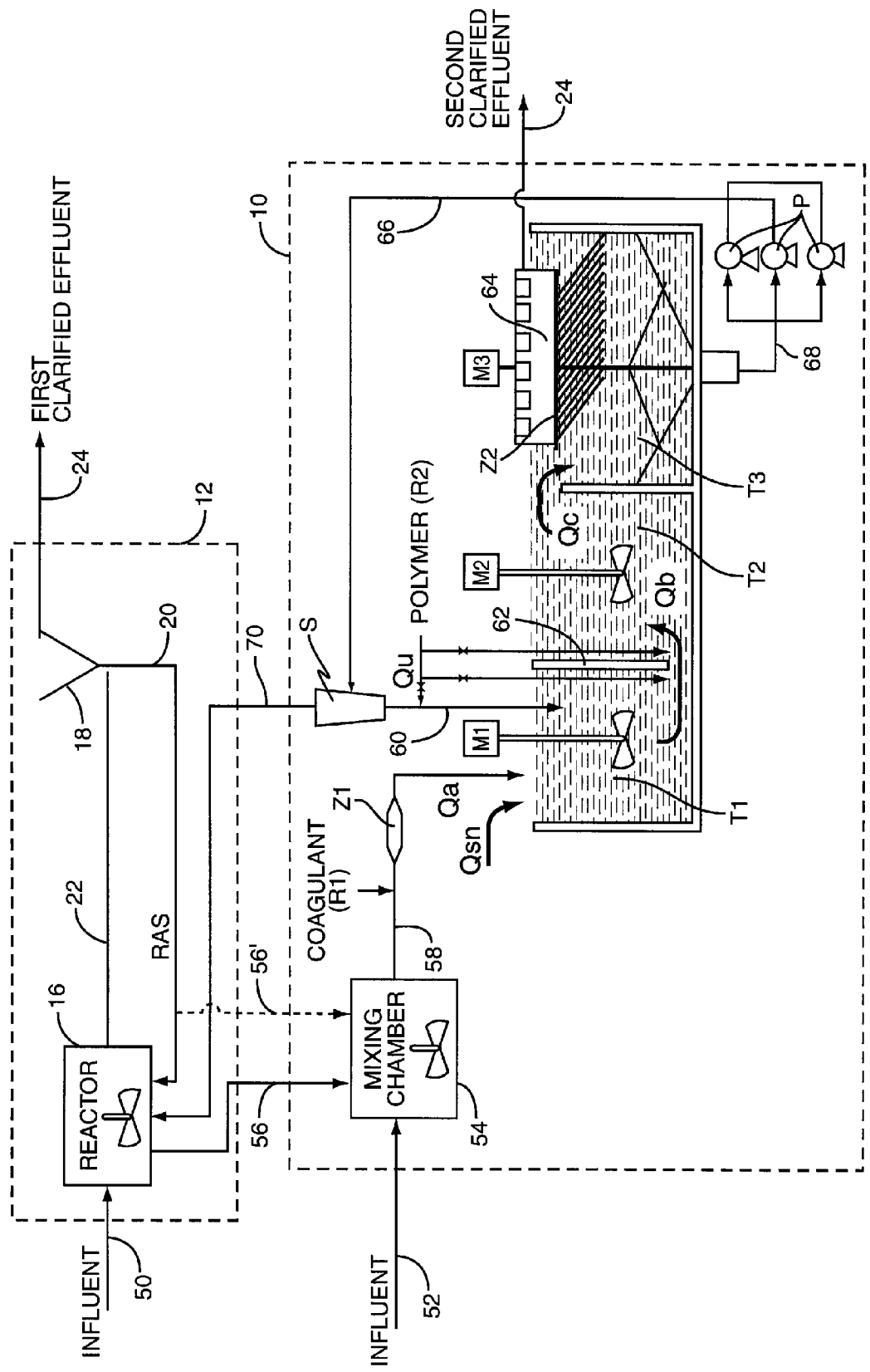
FIG. 2 depicts an alternate process for treating wastewater which includes a biological system and a ballasted flocculation system.

With reference to the drawings, particularly FIGS. 1 and 2, there is shown therein a combined biological system 12 and a ballasted flocculation system 10. Biological system 12 can assume different forms. In the embodiments illustrated herein, the biological system 12 is in the form of an activated sludge system. As will be appreciated from reviewing the processes of FIGS. 1 and 2, activated sludge is transferred from the biological system 12 to the ballasted flocculation system 10.

With respect to FIG. 1, the biological system 12 includes an influent line 14 that is operative to direct wastewater to be treated into one or more reactors 16. Downstream from the reactor 16 is a clarifier 18. A return activated sludge (RAS) line 20 extends from the clarifier 18 back to the reactor 16. A line 22 extends from the reactor 16 to the clarifier 18. Clarifier 18 includes an outlet line 24 for directing a first clarified effluent from the reactor 18.

The activated sludge system 12 depicted in FIGS. 1 and 2 can be designed to operate under aerobic, anoxic and/or anaerobic conditions, or a combination of any one of these three basic activated sludge process conditions. As noted above, the biological system could be provided with a series of reactors and some would typically include one or more mixers or aerators for aerating wastewater contained therein. Various types of mixers or aerators can be used to mix and/or aerate the mixed liquor in the one or more reactors 16. Typically wastewater is directed into the reactor 16 and mixed with return activated sludge that settles to the bottom of clarifier 18, which is pumped to the reactor 16 through line 20. Together, wastewater influent and return activated sludge form what is referred to as "mixed liquor" within reactor 16. Mixed liquor in reactor 16 is directed through line 22 to the clarifier 18 where the activated sludge settles to the bottom of the clarifier 18 and is effectively directed back to the one or more reactors 16 via line 20. In conventional fashion, a portion of the return activated sludge can be wasted. Sometimes herein, the activated sludge is referred to as a first sludge since, as will be discussed subsequently herein, the ballasted flocculation system 10 also produces a sludge.

As seen in FIG. 1, the treatment system includes the ballasted flocculation system 10. Line 26 is communicatively connected between line 22 and the ballasted flocculation system 10. Thus, a portion of the mixed liquor passing from the reactor 16 towards the clarifier 18 is directed through line 26 into and through the ballasted flocculation system 10. As used herein the term "wastewater" includes water that contains waste and which is subjected to treatment. The term "wastewater" encompasses mixed liquor which includes unactivated and activated sludge. In a preferred process, the other portion of the mixed liquor passing in line 22 is directed to the clarifier 18. The mixed liquor passing to the ballasted flocculation system 10 via line 26 is subjected to a ballasted flocculation process. In a typical ballasted flocculation process, a coagulant, flocculant, an insoluble granular material (ballast), such as microsand, is mixed with the water or wastewater, which in this case is in the form of mixed liquor, in the ballasted flocculation system 10. Through a settling process in the ballasted flocculation system 10, ballasted floc particles comprised of sand, suspended solids and other contaminants are settled. Because the mixed liquor being directed to the ballasted flocculation system 10 via line 26 includes activated sludge from the biological system 12, it follows that the activated sludge will have the effect of removing soluble BOD from the water or wastewater being treated in the ballasted flocculation system.

Various controls can be exercised in line 26. Mixed liquor passing in line 26 to the ballasted flocculation system 10 is subjected to a ballasted flocculation process. A coagulant R1 is added in line 26 or at some point in the ballasted flocculation 10. An inline mixer Z1 (which is optional) is operative to mix the coagulant R1 with the mixed liquor. In some cases the ballasted flocculation system 10 may include a separate coagulation tank with a mixer for mixing the coagulant with the mixed liquor. Coagulant R1 may comprise various compositions such as aluminum sulfate or ferric chloride. Dosages of the coagulant R1 can vary substantially based on the concentrations of the mixed liquor.

For purposes of reference, the mixed liquor passing line 26 to the ballasted flocculation system 10 is referred to as Qa. Flow Qa is directed into the ballasted flocculation system 10, and particularly to injection tank T1. Injection tank T1 includes a mixer M1. Disposed adjacent or over injection tank T1 is a separator in the form of a hydrocyclone S. Hydrocyclone S is a conventional apparatus that is used in water or wastewater treatment to separate insoluble granular material (microsand) from sludge or flocs surrounding the granular material.

A feed line 60 extends from the hydrocyclone S. Insoluble granular material is directed down the feed line 60 into the injection tank T1. Also, communicatively connected to the feed line 60 is a polymer line for injecting a polymer to either the injection tank T1 or an adjacent maturation tank T2. Polymer R2 can comprise various compositions. An example of an appropriate polymer is polyacrylamide polymer. Commercial examples of suitable flocculant are Magnafloc 155, an anionic product of CIBA Specialty Chemicals, or LT 22S, a cationic product of CIBA Specialty Chemicals. The dosages of these flocculants will be discussed subsequently herein.

Maturation tank T2 is separated from injection tank T1 by a wall 62. Note that wall 62 includes a lower opening that permits flow from injection tank T1 to maturation tank T2. Flow passing under the petition wall 18 is referred to as flow Qb.

Disposed in maturation tank T2 is a mixer M2. As illustrated in FIG. 1, the polymer or flocculant R2 can be injected into injection tank T1 or the maturation tank T2. Note that the flocculant injection line extends down each side of the petition wall 18 enabling the flocculant to be injected on either side thereof. Further, as noted above, the flocculant in the form of polymer R2 can be combined with the insoluble granular material, such as microsand, and fed into the injection tank T1 via feed line 60.

Disposed adjacent maturation tank T2 is a settling tank T3. Settling tank T3 functions as a clarifier and includes a surrounding wall structure. Lamella Z2 in the form of plates or tubes is optional. Disposed above the lamella Z2 is a collection trough 64. Settling tank T3 includes a settling tank scraper M3. As illustrated in FIG. 1, the flow passing from the maturation tank T2 to the settling tank T3 is referred to as flow Qc. Settling tank T3 is designed to collect or receive settled sludge about the bottom thereof. Settled sludge received about the central portion of the settling tank is directed through line 68 to one or more of a series of pumps P. As shown in FIG. 1 there are three pumps P in parallel, but the number of pumps P can vary. The reason for the series of pumps is to vary the flow of the sludge being pumped through line 68 into line 66 which connects to the hydrocyclone S. It is appreciated that a variable volume pump could be used. But in the case of the embodiment illustrated herein, a series of pumps are used, and when it is desired to increase or decrease the flow rate of sludge from tank T3, the number of pumps active can be varied accordingly. The pumps P and line 66 are simply shown schematically in FIGS. 1 and 2. In a preferred design there would be provided a separate line 66 for each pump P.

The settled sludge is pumped from the pumps P through line 66 to the hydrocyclone S. There the ballast or insoluble granular material, which is typically microsand, is separated from the sludge and recycled through the process via line 60. Hydrocyclone S separates the settled sludge into two basic parts, the ballast and the contaminants that aggregate around the ballast. The contaminants separated from the ballast are directed through line 70 back to the activated sludge system 12 and particularly to reactor 16. In some cases, a portion of the sludge separated from the ballast can be wasted or directed from the wastewater treatment system for further treatment.

Turning to FIG. 2, the process therein is similar to that illustrated in FIG. 1. However, in the embodiment of FIG. 2, the ballasted flocculation system 10 includes a mixing chamber 54. Either mixed liquor from the reactor 16 is directed via line 56 to the mixing chamber 54, or in the alternative, return activated sludge in line 20 is directed through line 56' to the mixing chamber 54 where the same is mixed with wastewater influent entering through line 52. Mixing chamber 54 is provided with a mixer or some other form of mixer for mixing mixed liquor or return activated sludge with influent that enters line 52. The mixed liquor resulting in mixing chamber 54 is directed through the ballasted flocculation system 10 as described above.

There are a number of operating parameters that have a significant impact on the effectiveness of treating wastewater with a combination biological treatment system and a ballasted flocculation system. In particular, the operating parameters of the ballasted flocculation system, operating in conjunction with the biological system, are of concern. The parameters of concern include sludge recycle rate, MLSS, rise rate, flocculant dosage, and ballast concentration. Sludge recycle rate refers to the sludge being recycled in line 66 of the ballasted flocculation system 10 to the hydrocyclone S. This sludge recycle rate is expressed as a percentage of the influent flow (flow through lines 52 and 56) to the ballasted flocculation system 10. In the case of FIG. 1, the influent to the ballasted flocculation system is the flow of mixed liquor passing in line 26 to the ballasted flocculation system 10. MLSS refers to the mixed liquor suspended solids concentration of the wastewater passing through the ballasted flocculation system 10. Rise rate is expressed in gpm/sq. ft (clarified flow rate divided by the up flow settling area) and pertains to the flow of effluent from tank T3 of the ballasted flocculation system 10.

Typically in conventional ballasted flocculation systems the sludge recycle rate is approximately 3% to 6%. In the combined biological and ballasted flocculation systems, the sludge recycle rate ranges from about 15% to 40% of the influent flow rate. That is, the sludge recycle flow rate passing through line 66 to the hydrocyclone S is approximately 15% to 40% of the flow rate of the influent into the ballasted flocculation system 10. Generally, the sludge recycle rate is also a function, in part at least, of MLSS and rise rate. As the MLSS concentration increases, and/or the rise rate increases, there is an increase in the sludge recycle rate. Typically, and in the way of an example, in cases where the MLSS concentration is approximately 1000 mg/l, the sludge recycle rate would be approximately 15%. At the other extreme, when the MLSS concentration is approximately 4000 mg/l, then the sludge recycle rate is about 35% to 40%. Thus, as the MLSS concentration varies from approximately 1000 mg/l to 4000 mg/l, the sludge recycle rate will vary between approximately 15% and 40%. In the way of another example, when the MLSS is approximately 2000 mg/l, the recycle rate is expected to be in the range of 15% to 30%. When MLSS is about 3000 mg/l, then it is anticipated that the sludge recycle rate would be approximately 25% to 40%.

Further, as an example, it is contemplated that a typical range of rise rate for systems of the type shown in FIGS. 1 and 2 is in the range of 15 gpm/sq. ft to 25 gpm/sq. ft. Again, as the rise rate increases, it is anticipated that the sludge recycle rate would also increase. For example, for a range of rise rate from 15 to 25 gpm/sq. ft., it is anticipated that the sludge recycle rate would be in the range of 15% to 40%.

In addition to varying the sludge recycle rate of the ballasted flocculation system 10, it is preferable to vary the flocculant dosage in accordance with the MLSS concentration. Typically, in processes such as exemplified in FIGS. 1 and 2, the polymer used as a flocculant would vary from about 8 mg/l to 24 mg/l. That is, at relatively low MLSS concentrations of, for example 1000 mg/l, a flocculant dosage of about 8 mg/l is preferred. As the concentration of MLSS increases, so would the flocculant dosage. For example, when the MLSS concentration is about 4000 mg/l, a preferred flocculant dosage is about 24 mg/l.

In addition, because of the nature of the wastewater being treated by the biological system 12 and the combined ballasted flocculation system 10 and the various conditions experienced during treatment, the concentration of the ballast, typically microsand, is substantially different from what would be ordinarily utilized in a ballasted flocculation system for drinking water treatment or wastewater treatment (tertiary or CSO). Typically, ballasted flocculation systems utilized to treat water, would contain a ballast, microsand, concentration of approximately 2 to 6 g/l. In the combined biological system 12 and ballasted flocculation system 10, the concentration would typically be maintained at 20 g/l or higher.

Therefore, the present invention contemplates varying and controlling the recycle rate of the second sludge, that is the sludge passing in line 66 of the ballasted flocculation system to the hydrocyclone S. It is contemplated that the sludge recycle rate will be maintained and controlled in the range of approximately 15% to 40% of the influent flow rate. In particular, as the MLSS concentration increases, then it is preferable to increase the sludge recycle rate. In addition, and even independent of MLSS, if the rise rate increases in the ballasted flocculation system 10, it is preferable to increase the second sludge recycle rate. As noted before, there are various ways of varying and maintaining the sludge recycle rate. One approach is to utilize a series of pumps and to increase or decrease sludge flow rate by switching various pumps on and off. Also, in addition to varying sludge recycle rate, the present invention contemplates varying flocculant dosage. As noted above, increases in MLSS concentration can call for an increase in flocculant dosage.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of treating wastewater with both a biological system and a ballasted flocculation system, comprising:
   a. directing a first wastewater stream to the biological system and biologically treating the first wastewater stream;

b. separating a first sludge from the wastewater in the biological system and producing a first effluent;

c. directing a second wastewater stream to the ballasted flocculation system;

d. transferring at least some of the first sludge from the biological system, and mixing the first sludge with the wastewater in the ballasted flocculation system to biologically treat the second stream of wastewater;

e. in the ballasted flocculation system, separating a second sludge from the wastewater in the ballasted flocculation system to produce a second effluent;

f. recycling the second sludge to a separator and separating ballast from the sludge; and g. maintaining the second sludge recycle rate such that the flow rate of the second sludge to the separator is 15% or more of the influent flow rate to the ballasted flocculation system.

2. The method of claim 1 including maintaining the second sludge recycle rate such that the flow rate of the second sludge to the separator is 15% to 40% of the influent flow rate to the ballasted flocculation system.

3. The method of claim 1 including varying the second sludge recycle flow rate based, in part at least, on the concentration of mixed liquor suspended solids in the wastewater being treated in the ballasted flocculation system.

4. The method of claim 3 wherein the second sludge recycle flow rate is maintained at 15% to 30% of the influent to the ballasted flocculation system when the wastewater being treated by the ballasted flocculation system has a mixed liquor suspended solid (MLSS) concentration of about 2000 mg/l, and wherein the second sludge recycle flow rate is maintained at 25% to 40% of the influent to the ballasted flocculation system when the wastewater being treated in the ballasted flocculation system has a mixed liquor suspended solid concentration of about 4000 mg/l.

5. The method of claim 1 including mixing insoluble granular material with the wastewater in the ballasted flocculation system and maintaining the concentration of the insoluble granular material at about 20 g/l and above.

6. The method of claim 1 including mixing a flocculant with the wastewater passing through the ballasted flocculation system and varying the concentration of the flocculant based on the concentration of MLSS in the wastewater in the ballasted flocculation system.

7. The method of claim 6 including varying the concentration of the flocculant from 8 mg/l to 24 mg/l.

8. The method of claim 7 including maintaining the concentration of the flocculant at about 8 mg/l when the MLSS concentration is about 1000 mg/l, and maintaining the flocculant concentration at about 24 mg/l when the MLSS concentration is about 4000 mg/l.

9. The method of claim 1 wherein the ballasted flocculation system includes a settling tank that produces a varying rise rate, and wherein the method includes increasing the second sludge recycle flow rate in response to an increase in rise rate.

10. The method of claim 9 including, for rise rates of 15 gpm/sq. ft to 25 gpm/sq. ft utilizing a second sludge recycled flow rate in the range of about 15% to 40% of the influent flow rate to the ballasted flocculation system.

11. The method of claim 1 wherein the ballasted flocculation system includes a settling tank that produces a varying rise rate, and wherein the method includes varying the second sludge recycle flow rate between 15% and 40% of the influent to the ballasted flocculation system, and wherein the second sludge recycle flow rate is dependent on both the rise rate and the MLSS concentration of the wastewater in the ballasted flocculation system.

12. A method of treating wastewater with both a biological system and a ballasted flocculation system, comprising:

a. directing a first wastewater stream to the biological system and biologically treating the first wastewater stream;

b. separating a first sludge from the wastewater in the biological system and producing a first effluent;

c. directing a second wastewater stream to the ballasted flocculation system;

d. transferring at least some of the first sludge from the biological system, and mixing the first sludge with the wastewater in the ballasted flocculation system to biologically treat the wastewater therein;

e. mixing a ballast of insoluble granular material with the wastewater that passes through the ballasted flocculation system and maintaining the concentration of the insoluble granular material to 20 g/l and above;

f. in the ballasted flocculation system, separating a second sludge from the wastewater in the ballasted flocculation system to produce a second influent;

g. recycling the second sludge to a separator and separating the ballast from the sludge; and h. maintaining the second sludge recycle flow rate such that the flow rate of the second sludge to the separator is 15% or more of the influent flow rate to the ballasted flocculation system.

13. The method of claim 12 including maintaining the second sludge recycle rate at 15%-40% of the influent flow rate to the ballasted flocculation system.

14. The method of claim 12 including varying the second sludge recycle flow rate based, in part at least, on the concentration of MLSS of the wastewater being treated in the ballasted flocculation system.

15. The method of claim 14 wherein the second sludge recycle flow rate is maintained at 15%-30% of the influent to the ballasted flocculation system when the wastewater being treated in the ballasted flocculation system has an MLSS concentration of about 2000 mg/l, and wherein the second sludge recycle flow rate is maintained at 25%-40% of the influent to the ballasted flocculation system when the wastewater being treated and the ballasted flocculation system has an MLSS concentration of about 4000 mg/l.

16. The method of claim 12 including mixing a flocculant with the wastewater passing through the ballasted flocculation and varying the concentration of the flocculant based on the MLSS concentration of the wastewater in the ballasted flocculation system.

17. The method of claim 16 including varying the concentration of the flocculant from 8 mg/l to 24 mg/l.

18. The method of claim 12 wherein the ballasted flocculation system includes a settling tank that produces a varying rise rate, and wherein the method includes increasing the second sludge recycle flow rate in response to an increase in rise rate.

19. The method of claim 18 including for rise rates of 15 gpm/sq. ft to 25 gpm/sq. ft utilizing a second sludge recycle flow rate in the range of about 15% to 40% of the influent flow rate to the ballasted flocculation system.

20. A method of treating wastewater with both a biological system and a ballasted flocculation system, comprising:

a. directing a first wastewater stream to the biological system and biologically treating the first wastewater stream;

b. separating a first sludge from the wastewater in the biological system and producing a first effluent;

c. directing a second wastewater stream to the ballasted flocculation system;
d. transferring at least some of the first sludge from the biological system, and mixing the first sludge with the wastewater in the ballasted flocculation system to biologically treat the second stream of wastewater;
e. in the ballasted flocculation system, separating a second sludge from the wastewater in the ballasted flocculation system to produce a second effluent, and wherein the ballasted flocculation system includes a settling tank having a variable rise rate;
f. recycling the second sludge to a separator and separating ballast from the sludge; and
g. controlling the second sludge recycle rate such that the second sludge recycle rate to the separator is 15% to 40% and is based at least partially on the rise rate of the settling tank of the ballasted flocculation system.

21. The method of claim 3 wherein the second sludge recycle flow rate is maintained at 15% to 30% of the influent to the ballasted flocculation system when the wastewater being treated by the ballasted flocculation system has a mixed liquor suspended solid (MLSS) concentration of 2000 mg/l, and wherein the second sludge recycle flow rate is maintained at 25% to 40% of the influent to the ballasted flocculation system when the wastewater being treated in the ballasted flocculation system has a mixed liquor suspended solid concentration of 4000 mg/l.

22. The method of claim 1 including mixing insoluble granular material with the wastewater in the ballasted flocculation system and maintaining the concentration of the insoluble granular material at 20 g/l and above.

23. The method of claim 7 including maintaining the concentration of the flocculant at 8 mg/l when the MLSS concentration is 1000 mg/l, and maintaining the flocculant concentration at 24 mg/l when the MLSS concentration is 4000 mg/l.

24. The method of claim 14 wherein the second sludge recycle flow rate is maintained at 15%-30% of the influent to the ballasted flocculation system when the wastewater being treated in the ballasted flocculation system has an MLSS concentration of about 2000 mg/l, and wherein the second sludge recycle flow rate is maintained at 25%-40% of the influent to the ballasted flocculation system when the wastewater being treated and the ballasted flocculation system has an MLSS concentration of 4000 mg/l.

* * * * *